United States Patent [19]
Ingenito et al.

[11] 3,869,627
[45] Mar. 4, 1975

[54] SYNCHRONOUS MOTOR

[75] Inventors: Michael J. Ingenito, New York, N.Y.; Paul J. Corser, Charlotte, N.C.

[73] Assignee: General Time Corporation, Thomaston, Conn.

[22] Filed: June 27, 1973

[21] Appl. No.: 374,022

Related U.S. Application Data

[63] Continuation-in-part of Ser. No. 227,072, Feb. 17, 1972, Pat. No. 3,803,433.

[52] U.S. Cl.................. 310/162, 310/156, 310/268
[51] Int. Cl. .......................................... H02k 21/08
[58] Field of Search...... 310/49, 268, 156, 162–164, 310/216–218, 190–193

[56] References Cited
UNITED STATES PATENTS

| | | | |
|---|---|---|---|
| 3,149,256 | 9/1964 | Kohlhager | 310/164 X |
| 3,475,630 | 10/1969 | Heinzen et al. | 310/268 X |
| 3,483,406 | 12/1969 | Inaba et al. | 310/49 |
| 3,522,501 | 8/1970 | Nyman | 310/49 X |
| 3,564,837 | 2/1971 | Keeler et al. | 58/23 A |
| 3,678,311 | 7/1972 | Mattingly | 310/156 |

Primary Examiner—Donovan F. Duggan
Attorney, Agent, or Firm—Pennie & Edmonds

[57] ABSTRACT

A synchronous self-starting timer motor having a disc shaped rotor with an annular ring of permanently magnetized poles about the periphery thereof. The magnetized poles are of alternately opposite polarity with the magnetic fields generated thereby being substantially perpendicular to the plane of the rotor. The stator includes a core having at least one pole pair which defines an axial air gap through which the magnetized annular pole portion of the rotor passes. Proximate each pole of the stator is a protrusion which extends in a direction parallel to the plane of the rotor and which perturbs the magnetic field passing between the poles such that the motor becomes self-starting when exited by an electrical current. The stator also has an energizing winding which induces an alternating or pulsating flux field in the core of the stator which field co-acts with the field of the rotor to drive the rotor at a speed proportional to the frequency of the flux field. The rotor has a low moment of inertia, is light in weight and has a large magnetic working area so that the synchronous motor is capable of generating high torque at a low input power level.

11 Claims, 16 Drawing Figures

PATENTED MAR 4 1975　　3,869,627

SYNCHRONOUS MOTOR

This application is a continuation-in-part of copending application Ser. No. 227,072, filed Feb. 17, 1972, for Synchronous Motor and assigned to the common assignee herewith and now U.S. Pat. No. 3,803,433.

BACKGROUND OF THE INVENTION

This invention relates to synchronous electric motors and, more specifically, to very inexpensive self-starting synchronous motors having high efficiency while requiring low power input. One use of the self-starting synchronous motor of this invention is for driving continuously a digital or direct read clock mounted in an automobile dashboard wherein the power input for the motor is from the customary automobile battery.

Synchronous timer motors have been used extensively in electric clocks for some time because of the simplicity of such motors and the accuracy of the rotational frequency at the output thereof. Complementing this is the fact that the typically low output torque of miniature synchronous motors is well suited to clocks which do not require high torque operating levels. In construction, prior timer or clock motors have often been exceedingly simple. The stator normally includes an energizing winding in the form of a simple concentrically wound coil which surrounds part of a magnetic circuit, designated the core, which distributes the generated magnetic flux with respect to a rotor. The rotor structure has taken many forms but can be a simple permanent magnet disc polarized to have alternating north and south poles about its periphery. The rotor is rotatably positioned with respect to the stator core such that the stator core and the rotor define a radial air gap through which the flux induced in the core passes. Because of the simple structure of such synchronous timer motors, they are easily manufactured and produced in large numbers resulting in a very low cost per unit. These motors, however, have been notoriously inefficient. For example, the efficiency of prior timer motors has normally been less than 1 percent, although, in some of the better grade motors having a more complex structure, the efficiency has been 2 percent or greater, an example of which is the motor disclosed in U.S. Pat. No. 3,469,131, issued Sept. 23, 1969, and which is assigned to the same assignee as is the present application. However, the motor of the stated patent is relatively expensive and for the same volume or size, does not have the torque capabilities of the motor disclosed herein.

Over the years battery powered clocks have been developed and are not very popular. These clocks generally operate by sustaining the reciprocating or oscillatory motion of a balance wheel, tuning fork, or pendulum which, in turn, mechanically drives the hands of the clock. A simple low power transistor oscillator circuit is typically utilized to sustain the reciprocating or oscillatory motion and, consequently, the low energy drain from the clock battery has permitted battery powered clocks to operate for months without requiring a change of battery.

Synchronous motors such as disclosed in the aforementioned U.S. Pat. No. 3,469,131, have been successfully used in battery powered clocks. However, as explained above, the motors are relatively expensive and do not have the capabilities necessary for rugged, low power applications. Accordingly, there has been a need for an efficient primary source of rotational energy so that the need for converting reciprocating motion into rotary motion can be eliminated. The converting of reciprocating motion to rotary motion involves added parts and steps in the assembling process thereby resulting in added cost of producing timepieces. Even more costly and complex is the mechanism in automobile clocks for converting intermittent reciprocating motion to a relatively smooth and uniform rotational motion. The use of this mechanism in automobile clocks has often resulted in automobile clocks keeping inaccurate time because the shock and the temperature and vibrational extremes normally experienced by the winding spring and associated parts of these clocks produced nonlinear torque outputs. The motor of this invention with its associated electronics eliminates the complex horology features of present automobile clocks, such as the hairspring, the balance wheel, the main spring rewind mechanism, etc. Moreover, this motor provides the torque necessary to drive displays other than conventional indicating hands, such as, for example, digital clock drums.

It, therefore, is an object of this invention to provide a simple, and efficient synchronous motor for powering battery operated clocks.

It is another object of this invention to provide an efficient, continuously operating source of rotational energy for automobile clocks in which the source of rotational energy is a self-starting synchronous timer motor which requires a low input power level.

SHORT STATEMENT OF THE INVENTION

Accordingly, this invention relates to an efficient synchronous motor for producing a relatively large output torque at a low power input level. The motor includes a stator having a core with at least one pole pair and an energizing winding coupled to the core to generate an alternating or pulsating flux field in the core for rotationally driving a rotor. The rotor is a disc having an annular ring of permanently magnetized poles about the periphery thereof. The magnetized poles are of alternately opposite polarity with the magnetic fields generated thereby being directed substantially perpendicular to the plane of the disc and parallel to the flux lines induced in the stator core by the stator windings. The annular magnetized portion of the rotor passes through an axial air gap which is defined by the stator pole pair. The rotor has a low moment of inertia and is lightweight with the magnetized portions thereof providing a large magnetic working area having a high retentivity. Consequently, the motor is capable of generating a high torque at a low power input level. Proximate each pole pair is a protrusion which extends in a direction parallel to the plane of the rotor and which perturbs the magnetic field generated by the stator such that the synchronous motor becomes self-starting.

BRIEF DESCRIPTION OF THE DRAWINGS

Other objects, features and advantages of this invention will be more fully understood from the following detailed description of the preferred embodiment, the appended claims and the accompanying drawings in which:

FIGS. 11 – 13 are diagrammatic views illustrating the flux flow between the stator and rotor of the motor disclosed in FIG. 1 – 5; and FIGS. 14 and 15 show diagrammatically the effect of rotor positioning under the influence of the improved stator configuration dislcosed in FIG. 8 – 10.

DETAILED DESCRIPTION OF THE PREFERRED EMBODIMENT

Figure 1:
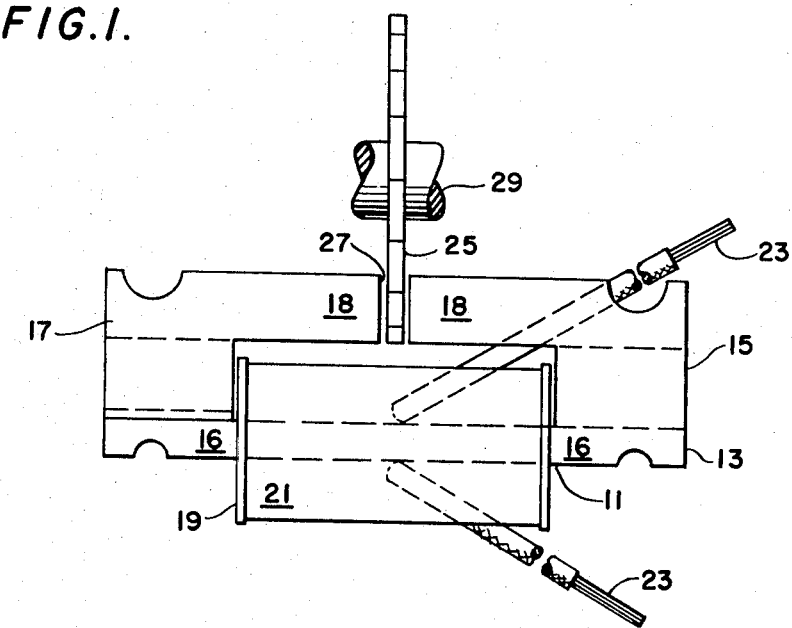
FIG. 1 is a plan view of the self-starting synchronous timer motor of this invention showing the rotor positioned in an axial air gap defined by the stator core.

Refer now to FIG. 1 which shows the preferred embodiment of the self-starting synchronous motor of this invention. The stator 11 includes a core 13 and an energizing winding 21. The core 13 includes two complementary annealed iron plates 15 and 17 which are preferably formed by a stamping process. In order to conserve space and to provide more efficient coupling with respect to energizing winding 21, the winding support legs 16 of the core plates 15 and 17 are offset with respect to each other as is more clearly illustrated in FIG. 2. The legs are positioned side-by-side and are spot welded to form a unitary stator core. Since the leg portions of the core are positioned side-by-side, the cross-sectional area of the core as it passes through the winding 21 has a square configuration which, as is well known, provides a very efficient electromagnetic coupling relationship with the winding 21. The other portions of the stator core outside of the winding 21 need not be as thick as the combined leg portions 16, and the optimum thickness of the stator in all areas other than the leg portions can be determined by techniques well known to those skilled in the art from a knowledge of the leakage flux at the pole faces of the stator core, the surface area of the rotor poles, the air gap between stator pole pairs, and the unmagnetized transition region between the adjacent north and south poles of the rotor.

A winding bobbin 19 comprised of any suitable material such as a hardened plastic material is supported by the winding support legs 16. The energizing winding 21 is concentrically wound about the bobbin and in the preferred embodiment is comprised of 6,000 turns of 43 gauge copper wire having a total resistance of approximately 860 ohms. It should be understood, however, that the number of turns and the wire gauge used may be of any suitable number and type depending on the number of stator pole pairs, the torque required, and the operating voltage range. Electrical current is coupled to the winding 21 via leads 23.

The end portions of the stator core passing outside of the winding 21 are separated to form an axial air gap 27 for the rotor 25. The size of the air gap depends on the thickness of the rotor and the DC magnetic stiffness desired. Thus, ordinarily, it is desirable to make the air gap large for manufacturing ease, but, as will be seen hereinbelow, the magnetic stiffness should not be too low so as to prevent efficient operation of the motor. The axial air gap permits the magnetic field generated by the stator to be directed onto the rotor perpendicular to the rotor plane and complementing this, the magnetic field generated by the rotor is directed to the stator poles perpendicular to the plane of the surface of the stator poles. This results in substantially less flux leakage and less reluctance to the magnetic field generated by the stator. Accordingly, the efficiency of the motor is materially improved.

Figure 2:
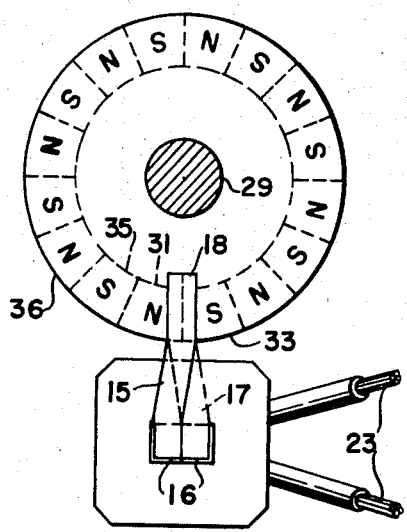
FIG. 2 is an end view of the synchronous motor showing the annular magnetized portion of the rotor.

The rotor is a disc having a thickness of approximately 0.023 inches and consists of a low density material such as barium ferrite in a rubber binder which is commonly sold under the trade name Plastiform and which is relatively inexpensive in the sizes required for the rotor. The residual induction value, i.e., retentivity of Plastiform, is 0.22 webers per meter$^2$ which, as will be seen hereinbelow, is of importance to the operating characteristic of the motor of this invention. As shown in FIG. 2, an annular ring about the outer periphery of the rotor is permanently magnetized through the thickness of the rotor to form an annular magnetic working area on both sides of the rotor. The magnetized area includes truncated triangular sections called rotor poles which are of alternately opposed polarity as can be most conveniently seen in FIG. 3. The poles are positioned so that they are contiguous to one another about the periphery of the rotor thereby rendering the entire annular ring available for generating alternately opposed magnetic fields. The rotor is mounted on an axial shaft 29 for rotation with respect to the stator by any suitable means known in the art. In the preferred embodiment there are sixteen rotor poles and the energizing winding 21 is excited with a current having a frequency of 64 Hz. Accordingly, the rotor is driven at eight cycles per second.

The aforementioned synchronous motor is of exceedingly simple yet rugged construction suitable for rapid mass production and for use in vibrational environments such as in automotive vehicles. As will be explained hereinbelow, since the rotor density is low, while at the same time having a large magnetic working area, the ratio of the moment of inertia of the rotor to the torque developed by the motor is low, thereby rendering the motor capable of self-starting. A simple no-back device cooperating with the gear train (not shown) is employed to insure rotation of the rotor in the desired direction. Such devices are very well known in the art to which this invention pertains.

The operation of the motor is according to well known principles of synchronous motors. Briefly, with the rotor positioned as shown in FIG. 2 and assuming it is rotating counterclockwise, the stator core passes a magnetic flux field through the rotor such that the north magnetic pole 31 is attracted to the stator pole pair. At the same time the south magnetic pole 33 is repulsed in the counterclockwise direction away from the stator pole pair. A fraction of a second later and after 1/16th of a complete rotation of the rotor, the magnetic field in the stator is reversed and the south magnetic pole 35 of the rotor is attracted to the stator pole pair and the north magnetic pole 31 is repulsed in the counterclockwise direction away from the stator. Thus, the stator pole is continuously driven by the interaction of the alternate polarity magnetic fields of the rotor and the alternating magnetic field in the stator. It should be understood that a pulsating unipolar magnetic flux field could also be generated in the stator. In such a case, the rotor north pole 31 would be attracted and the rotor south pole 33 repulsed when a unipolar pulse is coupled to winding 21. A fraction of a second later and after 1/8th of a complete rotation of the rotor, the magnetic field in the stator is again generated with the same polarity, hence north rotor pole 36 is attracted toward the stator and south rotor pole 35 is repulsed away therefrom in the counterclockwise direction. Since the rotor is driven once every 1/8th of a revolution rather than every 1/16th of a revolution, the movement of the rotor will be less smooth when excited by a unipolar pulsating magnetic field than when excited with a typical AC flux field.

The developed torque required to self-start a permanent magnet synchronous motor must be greater than the static friction torque plus the stiffness torque due to the permanent magnet plus the inertia torque of the rotor. The low density of the rotor material obviously reduces the friction and inertia torque and the permanent magnetic stiffness torque can be adjusted to the appropriate value depending on the specific use requirements of the motor. The average torque that can be developed by such a motor is proportional to the product of the magnetic field due to the impressed current in the windings and that due to the permanent magnets in the rotor. Both of these torques are dependent on the characteristics and geometry of the magnetic path through the rotor, stator and the air gap separating the rotor and stator. Since the rotor of this invention is thin and has a low moment of inertia and yet has a large magnetic working area, the motor is able to develop a large torque at low power input levels and at the same time requires relatively little starting torque when compared with prior art motors. The maximum torque required to self-start the synchronous motor of this invention can be shown to be:

$$T_r = 16 \pi J f^2/P_r \qquad 1.$$

where $T_r$ is the required torque, $J$ is the moment of inertia of the rotor, $f$ is the frequency of the current coupled to the energizing windings, and $P_r$ is the total number of rotor poles. It thus can be seen that the moment of inertia $J$ should be held to a minimum in order to reduce the torque required for self-starting.

Figure 3:
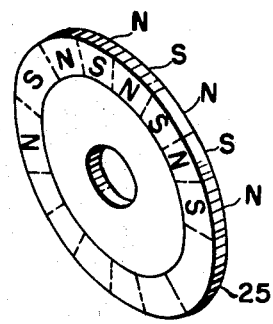
FIG. 3 is a perspective view of the rotor illustrating the annular ring of magnetic poles at the outer periphery thereof.

The proper expression for the moment of inertia of the rotor shown in FIG. 3 is:

$$J = D L_r A_r^2/2\pi \qquad 2.$$

where D is the density of the rotor material, $L_r$ is the thickness of the rotor magnet and $A_r$ is the total surface area of one side of the rotor disc. Substituting equation (2) into equation (1) the following equation is derived:

$$T_r = 8 D L_r A_r^2 f^2/P_r \qquad 3.$$

Thus, the maximum torque required for self-starting is directly proportional to the density of the rotor, the thickness of the magnetic poles, the square of the surface area of the disc, and the square of the frequency of the excitation voltage.

The expression for the maximum torque that can be developed by the synchronous motor of this invention is given as follows:

$$T_d = P_s P_r (L_g + L_r) \phi_s \phi_r/4 M o A_p \qquad 4.$$

where $T_d$ is the maximum torque that can be developed by the motor, $P_s$ is the number of stator pole pairs, $L_g$ is the air gap length, $\phi_s$ is the peak value of the magnetic flux in the air gap that is generated by the impressed current, $\phi_r$ is the maximum net magnetic flux in the air gap generated by the permanent magnets of the rotor, Mo is the permeability of free space and $A_p$ is the cross-sectional area of a single stator or rotor pole. It should be noted that the aforementioned formula is accurate provided that the stator iron does not become saturated, the flux in the air gap varies sinusoidally, and the gear train backlash of the associated clock is such that the motor is brought to synchronous speed before any load torque is reflected back to the rotor. In addition, it is assumed that the stator pole faces have the same geometric configuration as the rotor poles and that fringing effects are neglected. These conditions are typical of present day clock gear trains and of synchronous motors.

The flux expressions in equation (4) should be converted to expressions of current in order for equation (4) to be meaningful in terms of input power and efficiency. Thus, equation (4) can be rewritten as:

$$T_d = 0.16 P_s NI A_a R (L_r)/L_r + L_g \qquad 5.$$

where N is the number of turns in the energizing winding 21, I is the maximum current coupled thereto, $A_a$ is the total annular area of the permanent magnet poles, i.e., the magnetic working area, the R is the residual induction value of the Plastiform rotor material which is 0.22 webers per meter². Since the developed torque is proportional to the magnetic working area $A_a$, it is important that this area be made as large as possible such as by making the sides of each magnetic rotor pole contiguous with its neighbors.

Since the maximum average developed torque has to be equal to or greater than the maximum average required torque, equations (3) and (5) are equated to determine the required current.

$$I = 50D f^2 A_r^2 (L_r + L_g)/P_r P_s A_a R N \quad 6.$$

Equation (6) can now be applied to the synchronous motor illustrated in FIGS. 1–3 by assuming the following values for the parameters of the equation:

$P_s = 1$
$P_r = 16$
$L_r = 10^{-3}$ meters $L_g = 0.45 \times 10^{-3}$ meters.
$A_r = 1.26 \times 10^{-4}$ meters$^2$
$A_a = 0.79 \times 10^{-4}$ meters$^2$
$R = 0.22$ weber/meter$^2$
$D = 3.7 \times 10^3$ kilograms/meter$^3$
$f = 64$ Hz
$N = 6,000$ The value I required to self-start the synchronous motor is found to be 10.48 milliamperes, and the output torque developed is $1.21 \times 10^{-4}$ newton meters of 8.84 ounce inches. Since the output power is the product of the output torque and the angular speed of the rotor, the power output is computed to be 6.07 milliwatts.

Now the input power can be computed by the following formula:

$$P_I = I^2 R + P_c + P_o \quad 7.$$

where R is the total resistance of the winding which is approxomately 860 ohms, $P_c$ is the power loss in the core due to hystersis and eddy currents and is estimated to be approximately 50 microwatts, and $P_o$ is the power output. Accordingly, the power input can be computed and is:

$$P_i = 6.07 + 47.6 + 0.05 = 53.72 \text{ milliwatts}$$

The efficiency can now be computed and is:

$$E = P_o/P_{in} \ 100 \text{ percent} = 6.07/53.72 \ 100 \text{ percent} = 11.3 \text{ percent}$$

8.

As can be seen, the synchronous motor not only can develop sufficient torque for self-starting, but the efficiency thereof is a substantial improvement over the 1 percent efficiency levels of prior art simplified synchronous timer motor. If the motor is not required to be self-starting, as for example, in the case where the motor is started by hand, the high starting torque is not required and, hence, very low power operation is possible.

It can be seen from equation (6) that, if the number of stator poles is increased, the maximum input current required is reduced. Assume, for example, that the number of stator pole pairs is increased to 8. Applying the above formula, the maximum required input current can be found to be 1.31 milliamperes and the developed torque can be found to be 8.84 ounce-inches. Since the power output is the product of torque developed and the angular speed of the rotor, the power output $P_o$ is found to be 6.07 milliwatts which is the same as in the case where the stator has only one pole pair. Assuming the coil resistance to be 860 ohms, the input power to supply the copper losses is 0.744 milliwatts and the core losses will be approximately ten times higher than in the one stator pole case. Thus, the total input power $P_I$ can be computed by equation (7) and is 7.31 milliwatts. The efficiency according to equation (8) is:

$$E = P_o/PI \ 100 \text{ percent} = 6.07/7.31 \ (100) = 83.1 \text{ percent}$$

Thus, by increasing the number of stator poles, the efficiency of the synchronous motor is substantially increased.

Figure 4:
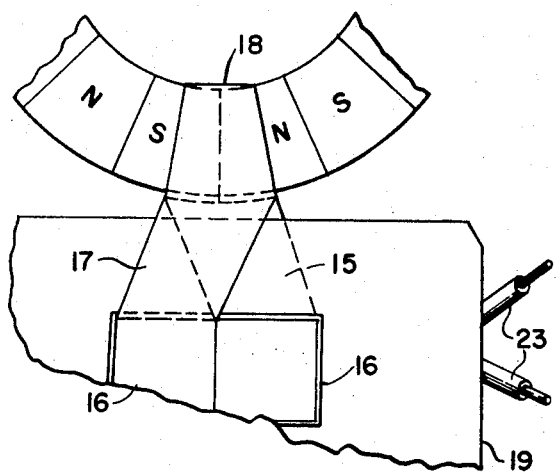
FIG. 4 is a partial plan view of the rotor and stator assembly showing the relative endwise configuration of the stator with respect to the rotor.

Refer now to FIG. 4 which is a partial end view of the stator showing the configuration of the stator pole face with respect to the magnetized portion of the rotor. As shown, the stator portion 18 is in the form of a truncated triangle. This configuration most nearly matches the configuration of the permanently magnetized pole faces of rotor 25. The upper leg portion 18 of the stator extends downward to the lower leg portion 16 thereof with the windings 21 not shown. The leg 16 of plate 17 is the stator is shown and, as aforementioned, is spot welded to plate 15 to form a unitary stator. It should be understood that, while the aforementioned equations were developed with respect to a stator pole having the configuration shown in FIG. 4, the stator poles can have a rectangular configuration as illustrated most clearly in FIG. 2. The rectangular pole face construction requires fewer steps in manufacturing the stator thereby reducing the cost of the motor while, at the same time, the characteristics of the motor, including efficiency, are not substantially adversely affected by such a modification in the stator pole configuration.

Figure 7:
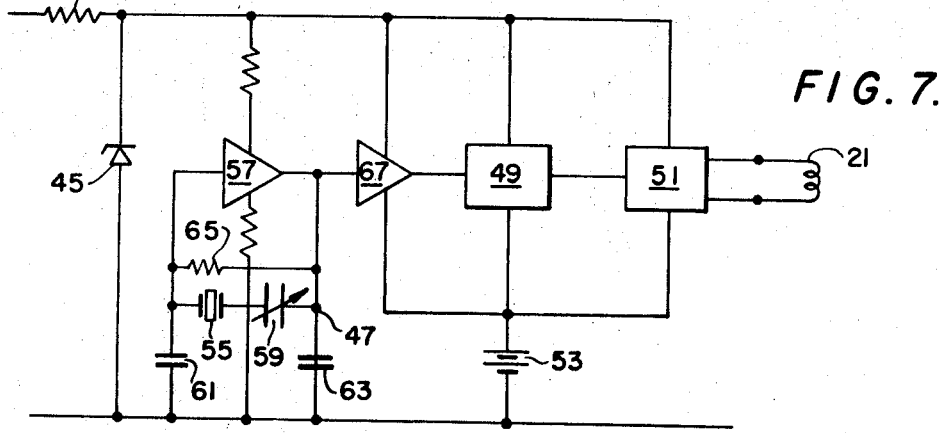
FIG. 7 is a schematic diagram of the circuit for driving the synchronous motor of this invention.

Refer now to FIG. 7 where there is shown a schematic diagram of a drive circuit for providing AC energization to the winding 21 of the synchronous motor. The circuit is comprised of three fundamental parts, namely, a crystal controlled oscillator designated by the numeral 47, a divider circuit 49 and a drive circuit 51. DC power is coupled to the circuit via resistor 43 which provides transient current protection for each of the three components of the circuit. A zener diode 45 is coupled between the low voltage end of resistor 43 and a reference potential such as ground. A second DC source 53 is coupled to the divider and drive circuits for providing the appropriate bias potential thereto.

The oscillator circuit includes a quartz crystal 55 which is designed to oscillate at 262,144 Hz. Quartz crystals are well known and are readily available commercially. The crystal 55 is connected at one end thereof to the input of an amplifier 57 and the other side thereof is coupled to the output of the amplifier via a variable capacitor 59. The input of amplifier 57 is also connected to reference potential via a fixed capacitor 61 and the output of the amplifier is coupled to reference potential via fixed capacitor 63. A biasing resistor 65 is connected between the input and output terminals of amplifier 57 and biases the amplifier 55 in its active region to initiate oscillation of oscillator 47. Variable capacitor 59 operates to vary the resonant frequency of the crystal oscillator thereby varying the frequency at the output of amplifier 57. The output of the amplifier 57 which is 262,144 Hz is connected to a buffer amplifier 67 which preferably has a high input impedance so that operation of the divider stage 49 does not adversely affect the frequency of the output of the oscillator 47. The output of buffer amplifier 67 is connected to divider 49 which includes a plurality of binary divider stage. In the preferred embodiment, the divider 49 includes twelve serially connected flip-flops which divide the output of the crystal oscillator down to 64 Hz. The output of the divider is connected to a drive circuit 51 which provides an output current on the order of several milliamperes for energizing the windings 21. The divider circuit 49, the drive circuit 51, buffer amplifier 67 and the amplifier 57 are formed on an integrated circuit chip commonly known as a complementary metal oxide semiconductor (C-MOS) by integrated circuit techniques well known in the art. The circuit illustrated in FIG. 7 provides not only a highly stable 64 Hz output for driving windings 21 but also requires very little power from the Dc source of energy.

Figure 5:
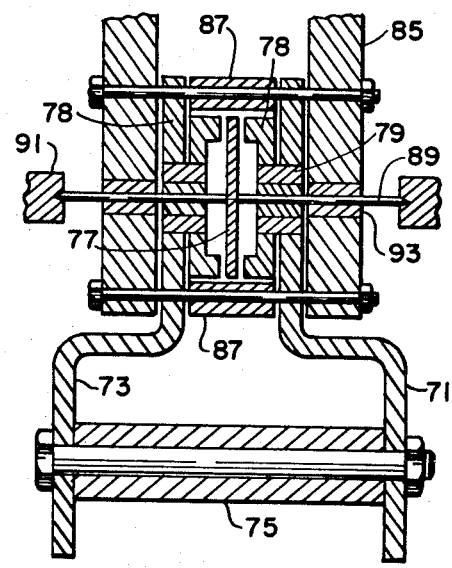
FIG. 5 is a side section view of the self-starting synchronous timer motor of this invention with the stator having a plurality of pole pairs.
Figure 6:
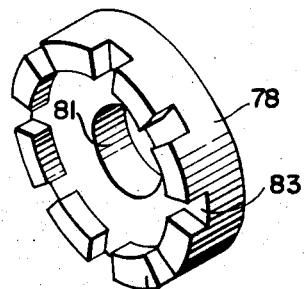
FIG. 6 is a detailed illustration of the stator pole structure of the synchronous motor of FIG. 5.

Refer now to FIG. 5 where there is shown a cross-sectional view of a multi-stator pole self-starting synchronous motor. The stator includes a core portion comprising a pair of legs 71 and 73 with a cylindrical connecting arm 75 separating each of the legs. The connecting arm 75 consists of a soft iron material and has a hole therethrough through which a bolt extends for securing the connecting arm to the legs 71 and 73. The legs 71 and 73 are bent inwardly toward each other proximate the rotor 77 with each of the legs having aligned holes for permitting the rotor spindle or shaft 89 to pass therethrough. A bushing 79 is positioned in each hole. A pair of complementary stator pole pieces each having eight pole faces thereon are mounted on each bushing with the pole faces of the pole pieces being directed toward each other as shown in FIG. 5. A pole piece is shown in perspective in FIG. 6. A hole 81 extends through the center thereof into which is positioned a bushing 79. At the external periphery of the pole pieces are a plurality of pole faces 84 extending upwardly away from the base portion of the pole piece. Each of these faces are separated by a notched portion 83. The pole faces, as shown, take the form of a truncated triangle having the same general configuration as the magnetized portion of the rotor shown in FIG. 4.

The stator is supported by means of a pair of brackets 85 which consist of a non-magnetized material. The pole pairs 78 are separated or spaced with respect to each other by means of a pair of spacers 87 positioned between the legs 71 and 73 of the stator and are secured in place by a pair of bolts extending through the brackets 85, the legs 71 and 73, and the spacers 87. A rotor 77 is positioned between the pole pairs 78 with an axial air gap separating the rotor from the pole pairs. The rotor is mounted on a spindle 89 which is journaled for rotational motion in the frame of the motor 91. Axial bearings 93 permit relatively frictionless rotational movement with respect to brackets 85 and axial bearings 94 permit relatively frictionless movement of the spindle 89 with respect to bushings 79.

In operation, the multi-stator rotor of FIG. 5 attracts and repels the rotor poles in the same manner as the single stator pole rotor except that more stator poles are now attracting and repelling the corresponding rotor poles thereby generating a larger torque output.

Figure 8:
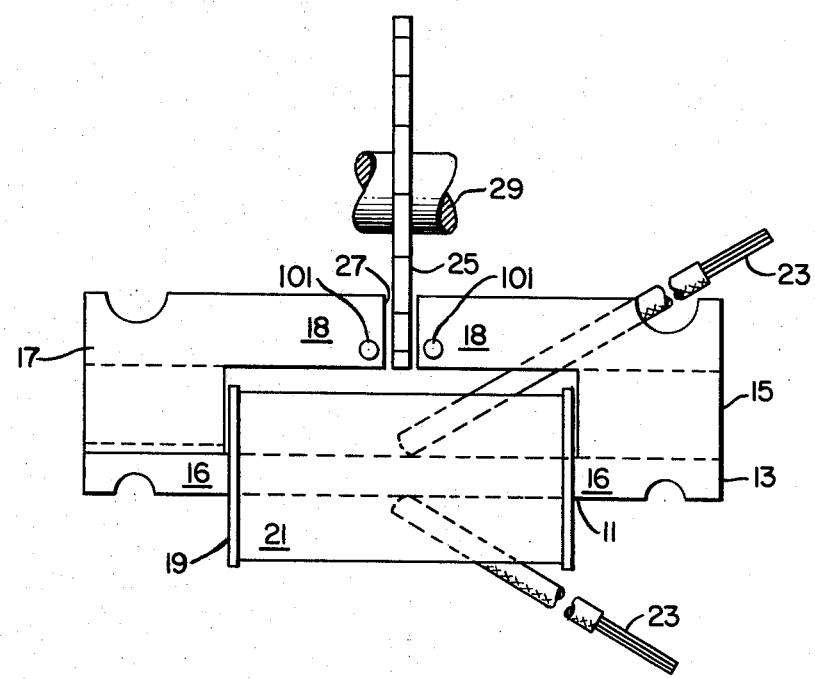
FIG. 8 is a plan view of the self-starting synchronous timer motor of this invention showing a pair of protrusions of the stator pole pairs.
Figure 9:
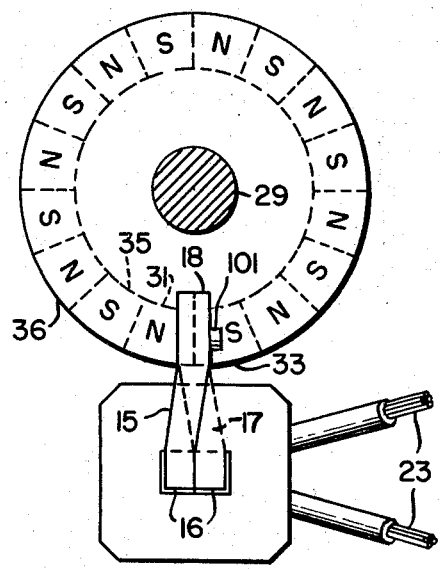
FIG. 9 is an end view of the synchronous motor of FIG. 8.

In accordance with this invention attention is directed initially to FIG. 8. As illustrated, the stator core 13 has a protrusion 101 positioned on each stator plate 15 and 17 proximate the air gap 27. The protrusions extend in a direction parallel to the plane of the rotor 25 as is best shown in FIG. 9 which is an end view of the motor of FIG. 8. The protrusions are shown extending to the right (in the direction that the rotor turns) of the upper portion 18 of the stator plates 15 and 17. The protrusions conduct the magnetic field passing from one stator pole through the rotor to the opposite stator pole. With the magnetic field so directed a portion thereof passes through the next succeeding magnetic segment of the rotor thereby reducing the possibility at start-up that the rotor will become locked when it is aligned directly between the stator pole pair, as will be further explained below. The protrusions herein designated 101 may be of any suitable shape or size, but, in the preferred embodiment, are of a cylindrical shape 0.062 of an inch in diameter and protrude 0.035 of an inch. It has also been found that the round configuration facilitates forming of the protrusions in the stator core and that they be situated proximate the outer periphery of rotor 25.

Figure 11:
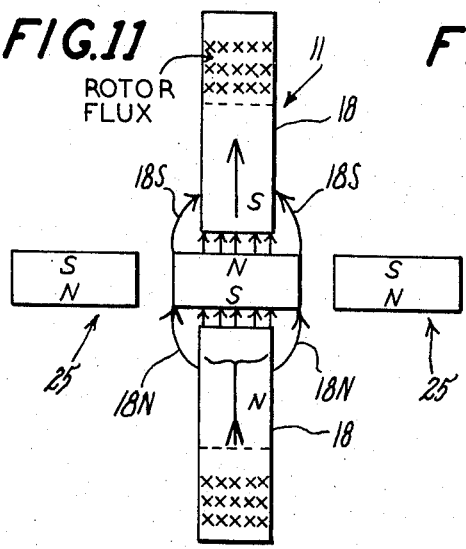
FIGS. 11 and 11a are schematic illustrations of the magnetic flux path between stator and rotor.
Figure 11A:
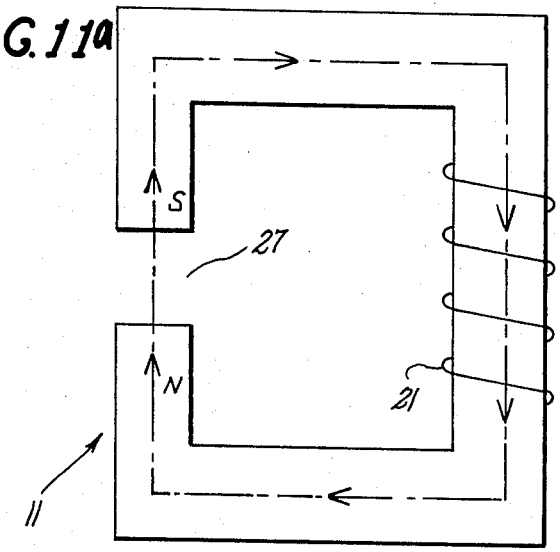

Regarding the particulars of motor start-up, attention is first directed to FIGS. 11 and 11a, which are pertinent to FIGS. 1 – 5. As simply illustrated, the magnetic flux component that emanates from a rotor north pole follows the stator iron and flows to the rotor south pole directly behind. Supplementing FIGS. 11 and 11a, FIG. 12 further traces a component of magnetic flux flowing from the rotor north pole wherein the flux uses the stator iron adjacent gap 27 to flow to the two adjacent south poles of rotor 25. The rotor south pole, direclty behind the rotor north pole, can be considered the terminal (again through the stator iron adjacent gap 27) for some of the flux flow from the two adjacent north poles. FIG. 13 is similar to FIG. 11 but illustrates diagrammatically a greater component of magnetic flux that is induced in stator 11 as a result of current applied to winding 21.

Figure 14:
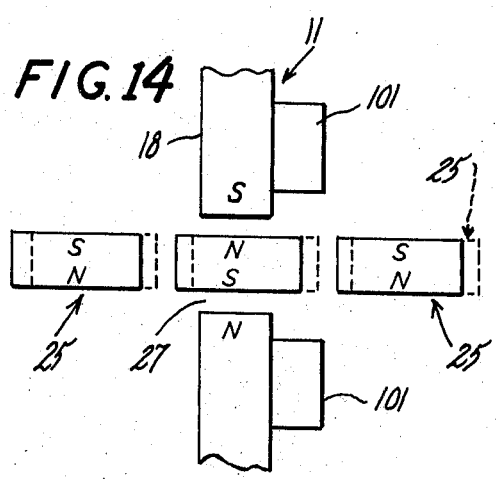
FIGS. 14 and 15 are views similar to FIG. 11 illustrating movement of the rotor under certain conditions.
Figure 15:
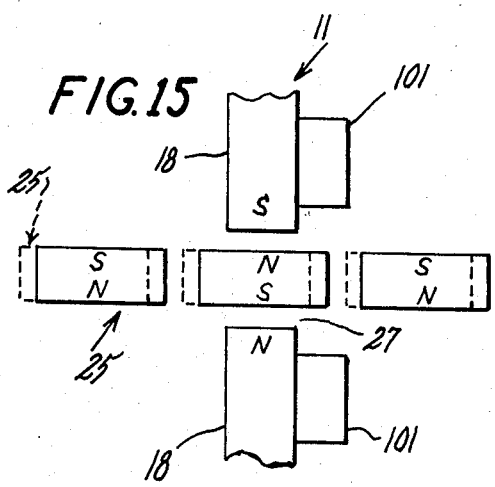

Consider now the condition wherein no current is applied to coil 21 and iron projections 101 are added to the right side of stator portions 18, preferably but not necessarilly, in the direction in which the rotor is desired to turn. As shown in FIG. 14 such condition would cause the rotor poles 25 to move rightwardly to the dotted position indictaed in FIG. 14 and there settle if the effect of the flux component in FIG. 11 was stronger than the effect of the flux component shown in FIG. 12. The rotor poles would move leftwardly as shown in FIG. 15 if the effect of the flux component shown in FIG. 12 was stronger than the flux component shown in FIG. 11. It being well accepted that a magnet will always tend to align relative to iron so that maximum magnetic flux is coupled from a north pole to a south pole. It is an experimental fact that the effect of the flux component shown in FIG. 12 predominates and the rotor takes up the position in FIG. 15. The significance of the above condition will now be set forth in connection with the axial consideration of motor starting.

Figure 12:
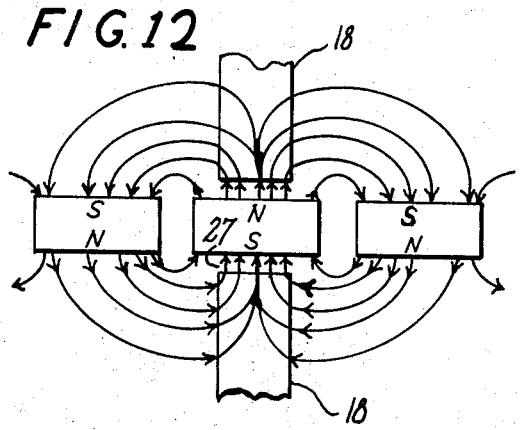
FIG. 12 illustrates schematically a component of magnetic flux from a rotor north pole.
Figure 13:
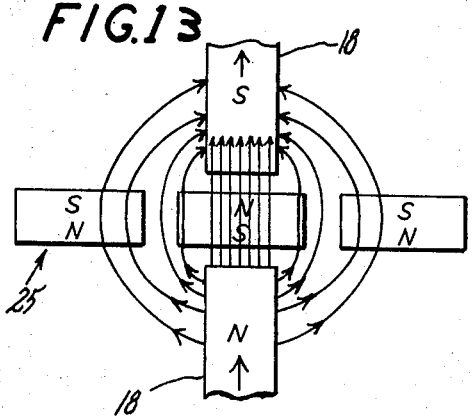
FIG. 13 is similar to FIG. 11 illustrating, however, a greater component of magnetic flux.

Initially, consider the stator 11 minus projections 101 (FIGS. 1 – 5 and 11 – 13). Without current applied to the coil winding 21, rotor 25 will align relative to the stator as illustrated in FIGS. 11 and 12. When alternating current is applied to the coil winding 21, a magnetic flux will be induced in stator 11 (see FIG. 13). The polarity of flux corresponds with a particular half cycle polarity of applied alternating current and will react with the rotor flux. With the respective polarities shown in FIGS. 11 – 13, and because of mutual attraction between rotor and stator, the rotor will be held in the air gap area during the initial half current cycle in the energized winding. During the subsequent half cycle, the rotor will be accelerated out of the air gap area as a result of the mutual repulsion. However, if high frictional characteristics in connection with the rotor exist, the generated accelerating torque may not be of sufficient magnitude to adequately propel the rotor. This results in the rotor becoming trapped in the air gap area and the motor does not start, or under fluctuating voltage conditions, will stall if running.

An improved rotor-stator arrangement would be to accelerate the rotor during both halves of the current cycle. This could readily be accomplished by making the stator poles 18 approximately twice the width of the stator poles shown in FIGS. 14 and 15 while retaining the rotor poles the same as shown. This, of course, would result in a more powerful motor as the running torque would be greater due to the increased flux generation resulting from lower reluctance. On the other hand, however, the input energy required to start the motor would necessarily have to be quite high because of the so-called stiffness torque that must be overcome.

Accordingly, desired is to arrange for the stator to "see" both polarities of the rotor poles, but not at the expense of increasing magnetic stiffness to a degree that would hinder starting. It can be appreciated that FIG. 15 position of the rotor 25 with respect to the stator position 18 contributes much more to this accomplishment than does the FIG. 14 position of those members.

To summarize, the novel adaptation of the projections 101 has increased the flux component shown in FIG. 12 and decreased the flux component shown in FIG. 11; the magnetic stiffness has not increased to a significant degree and the stator 101 of this invention sees more of both adjacent rotor poles so that self-starting is considerably facilitated.

Moreover, such condition is vital with regard to an automobile clock when the ignition key is turned to "on." With energization of the starter motor the battery voltage falls considerably below its rated 12 volts, particularly in a cold climate. Should the reduced voltage fail to maintain the clock operational, it might not restart, or at best, lose several seconds at each turn of the ignition key. It is obvious, therefore, that under such circumstances the clock might lose appreciable time over a protracted period. The efficient rotor-stator combination of this invention not only eliminates such starting difficulties but also serves to keep the motor and the clock going under severe conditions.

Figure 10:
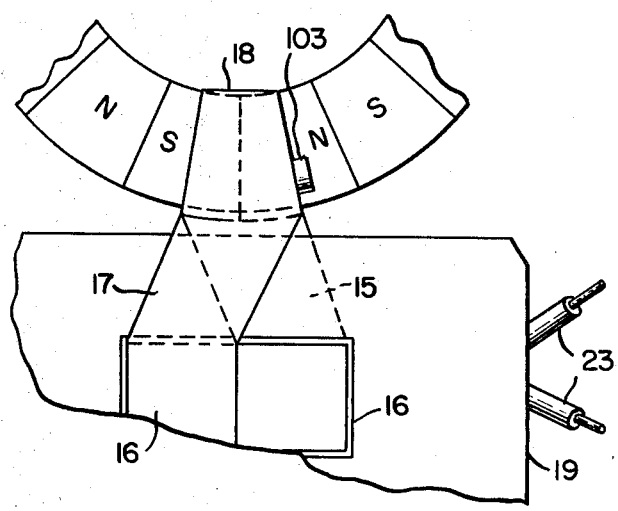
FIG. 10 is an end view of an alternate embodiment of the synchronous motor of this invention.

Attention is now directed to FIG. 10 which is an end view of an alternate embodiment of the synchronous motor of this invention showing a protrusion 103 extending from the upper portion 18 of the stator core plate 17 in a direction parallel to the plane of the rotor. An identical protrusion is positioned on the upper portion 18 of stator core plate 15 such that the two protrusions extend in the same direction and are positioned proximate the air gap between the stator pole pair. As aforementioned, these protrusions augment the magnetic field passing from the stator poles through the rotor and substantially enhance the starting performance of the motor as the rotor is prevented from "locking" when a magnetic segment of the rotor, having a given polarity, becomes positioned directly between the stator pole pair defined by the ends of stator plates 15 and 17.

The synchronous motors described herein are particularly well adapted for driving automobile clocks since they are of simple yet rugged construction thereby rendering the motors amenable to mass production techniques. Further, since the synchronous motors provide direct rotational energy to a clock gear train, the intermittent reciprocal to rotational motion converting mechanism normally required in automobile clocks which is susceptible to ambient temperature variations and shock is not required thereby providing a more accurate automobile clock. Finally, the increased efficiency of these motors permits their use in automobiles without concern that the battery might be drained of energy by the motor. While several embodiments of the self-starting synchronous motor have been described, it is within the contemplated scope of this invention that numerous changes can be made in the embodiment described without departing from the spirit and scope of the invention as defined by the appended claims.

We claim:
1. A synchronous motor comprising:
a disc shaped motor having an annular ring of permanently magnetized poles extending through the thickness and about the periphery thereof, each of said poles having a pole of opposite polarity positioned contiguously on each side thereof;
a stator including a core and an energizing winding, said core having at least one pole pair which defines an axial air gap through which passes the permanently magnetized annular portion of said rotor, said energizing winding being coupled to said stator core for providing an energizing flux field in said core, said flux field passing between said stator poles through said rotor substantially perpendicular to the plane of said rotor, the magnetic field generated by said rotor poles passing through said stator substantially perpendicular to the surface of said stator pole pair; and
supplemental flux conducting means carried by said stator, said supplemental flux conducting means including a protrusion extending therefrom in a plane parallel to the plane of said rotor and located adjacent said rotor periphery for enhancing flux flow between rotor and stator during operation.

2. The motor of claim 1 wherein said rotor is comprised of a low density material of high retentivity and wherein said annular ring of permanently magnetized poles are integral with and magnetized axially of said rotor, said rotor thereby having a low moment of inertia and a large magnetic working area, and said supplemental flux conducting means adjacent said rotor poles carried by and as an integral portion of said stator, said motor thereby providing a high torque output relative to the moment of inertia thereof.

3. The motor of claim 2 wherein the rotor material consists of barium ferrite powder mixed with a low density binder.

4. The motor of claim 2 wherein said stator has only one stator pole pair.

5. The motor of claim 2 wherein said stator core includes a pair of complementary pole pieces, said pole pieces forming a plurality of pole pairs with each pole pair having the approximate configuration of said rotor poles.

6. A synchronous motor comprising a disc shaped rotor having an annular ring of permanently magnetized poles extending through the thickness thereof, each of said poles having a pole of opposite polarity positioned contiguously to each side thereof, and a stator including a core and an energizing winding, said core having at least one pole pair which defines an axial air gap through which passes the permanently magnetized annular portion of said rotor, said poles each having a protrusion extending therefrom in a plane parallel to the plane of said rotor, said energizing winding being coupled to said stator core for providing an energizing flux field in said core, said flux field passing between said stator poles through said rotor substantially perpendicular to the plane of said rotor but with a slight perturbation thereof due to said protrusion to thereby prevent locking of said rotor with respect to said stator, the magnetic fields generated by said rotor poles passing through said stator substantially perpendicular to the surface of said stator pole pair.

7. The motor of claim 6 wherein said rotor is comprised of a low density material having a high retentivity and wherein said annular magnetized poles of said rotor are integral with said rotor, said rotor thereby having a low moment of inertia and a large magnetic working area, said motor thereby providing a high torque output relative to the moment of inertia thereof.

8. The motor of claim 6 wherein the rotor material consists of barium ferrite powder mixed with a low density binder.

9. The motor of claim 6 wherein said stator has only one stator pole pair.

10. A synchronous motor comprising:
a disc shaped rotor comprised of a low density material having a high retentivity, said rotor having an annular ring of permanently magnetized poles extending through the thickness, about the periphery and integral with said rotor, said rotor thereby having a low moment of inertia and a large magnetic working area, each of said poles having a pole of opposite polarity positioned contiguously on each side thereof;
a stator including a core including a pair of complementary pole pieces and an energizing winding, said pole pieces forming a plurality of pole pairs which define an axial air gap through which passes the permanently magnetized annular portion of said rotor, each pole piece being rigidly secured to said stator core and aligned coaxially with said rotor, each said pole piece further having the approximate configuration of said rotor poles, said energizing winding being coupled to said stator core for providing an energizing flux field in said core, said flux field passing between said stator poles through said rotor substantially perpendicular to the plane of said rotor, the magnetic fields generated by said rotor poles passing through said stator substantially perpendicular to the surface of said stator pole pair; and
supplemental flux conducting means carried by said stator, said supplemental flux conducting means comprised of a protrusion formed out of and integral with said stator, said supplemental flux conducting means located adjacent said rotor poles and extending in the direction of rotor rotation for enhancing flux flow between rotor and stator, said motor thereby providing a high torque output relative to the moment of inertia thereof.

11. A synchronous motor comprising:
a disc shaped rotor comprised of a low density material having a high retentivity, said rotor having an annular ring of permanently magnetized poles formed integrally therewith and extending through the thickness thereof, said rotor thereby having a low moment of inertia and a large magnetic working area, said motor thereby providing a high torque output relative to the moment of inertia thereof, each of said poles having a pole of opposite polarity positioned contiguously to each side thereof; and
a stator including a core and an energizing winding, said stator core including a pair of complementary pole pieces, said pole pieces forming a plurality of pole pairs which define an axial air gap through which passes the permanently magnetized annular portion of said rotor, each pole pair having the approximate configuration of said rotor poles and having a protrusion extending from one side thereof in a plane parallel to the plane of said rotor and in a direction parallel to the direction of rotation of said rotor, said energizing winding being coupled to said stator core for providing an energizing flux field in said core, said flux field passing between said stator poles through said rotor substantially perpendicular to the plane of said rotor but with a slight perturbation thereof due to said protrusion to thereby prevent blocking of said rotor with respect to said stator, the magnetic fields generated by said rotor poles passing through said stator substantially perpendicular to the surface of said stator pole pair, said motor thereby providing a high torque output relative to the moment of inertia thereof.

* * * * *